(No Model.)
I. J. FRENCH.
PIPE COUPLING OR UNION.
No. 558,378. Patented Apr. 14, 1896.
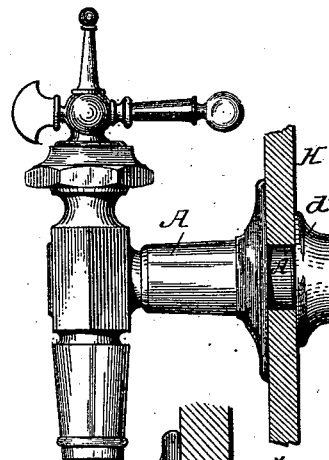
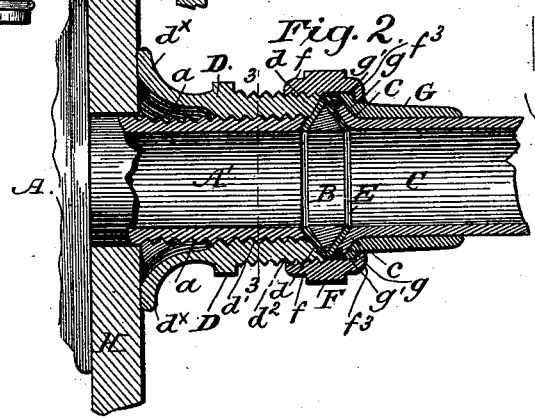
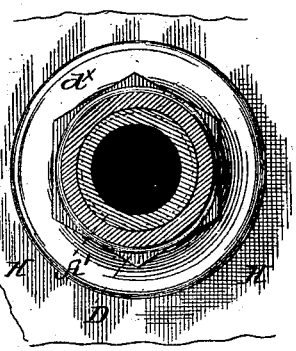
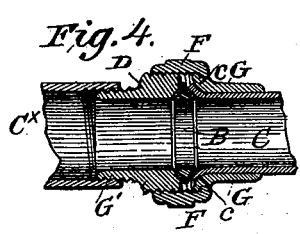
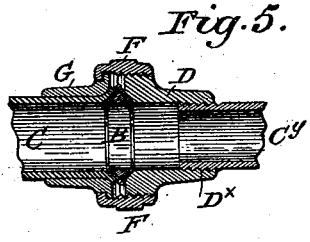
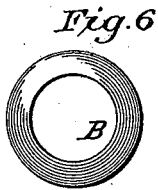
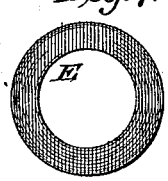
WITNESSES:
Fred G. Dieterich
Jas. L. Crawford
INVENTOR
Irwin J. French
BY
John M. O'Meara
ATTORNEY.

UNITED STATES PATENT OFFICE.

IRWIN J. FRENCH, OF WASHINGTON, DISTRICT OF COLUMBIA, ASSIGNOR OF TWO-FIFTHS TO LUKE J. CROGHAN AND LUKE J. KEARNEY, OF SAME PLACE.

PIPE COUPLING OR UNION.

SPECIFICATION forming part of Letters Patent No. 558,378, dated April 14, 1896.

Application filed August 21, 1894. Serial No. 520,907. (No model.)

*To all whom it may concern:*

Be it known that I, IRWIN J. FRENCH, residing in the city of Washington, in the District of Columbia, have invented a new and Improved Pipe Coupling or Union, of which the following is a specification.

My invention relates generally to improvements in coupling or union connections for joining the ends of lead-pipe sections or a lead to a brass or other hard-metal section, and it more particularly refers to a coupling or union member which, while serving to connect such sections, is also adapted to form a means whereby the lead supply or exit pipe-section can be quickly and effectively joined to the threaded shanks of valves, cocks, waste-outlets, &c., and also clamp and secure such valves, cocks, &c., in position without the necessity of additional securing means therefor.

My invention has primarily for its object to provide a union or pipe coupling of the above character which can be used at all points where "wiped joints" are usually made, and which is so designed as to abolish the use of lock-nuts, brass-wipings, couplings, and thimbles, and to dispense with the use of such soldered or wiped joints.

It has also for its object to provide a union or pipe coupling which will not fracture or otherwise injure the pipes, which can be quickly adjusted in position, and which will embody the elements of simplicity, economy in construction, and general efficiency.

With other objects in view, which hereinafter will appear, the invention consists in such novel features of construction and peculiar combination of parts as will hereinafter be first described in detail and then be specifically pointed out in the appended claim, reference being had to the accompanying drawings, in which—

Figure 1 is a side elevation illustrating the preferred form of coupling devices. Fig. 2 is a longitudinal section of the same. Fig. 3 is a transverse section, taken on the line 3 3, Fig. 2. Fig. 4 is a longitudinal section of a modified form of union, the same being in the nature of a male union. Fig. 5 is a similar view of a female union. Fig. 6 is a detail view of the brace or abutting ring, and Fig. 7 is a view of the packing ring or gasket.

In the preferred construction of the union or coupling member—that is, when constructed for connecting the shank of cocks or valves with the lead-pipe section—the same comprises a brace or abutting ring B, formed of solid metal and triangular in cross-section, which, when the joint is made, rests between the end of the threaded shank A' of the cock A and the end of the lead-pipe section C, as shown clearly in Fig. 2 of the drawings. By reference to such figure it will be noticed the end of the lead-section is flared to form an angular and annular bearing-flange $c$, which bears against one face of the ring B, while the other face of said ring is held to bear against the reamed-out end of the shank A' and the beveled end $d$ of a clamp-ring or nut member D, which is internally threaded, as at $d'$, to fit on the external threads $a$ of the shank A', and externally threaded, as at $d^2$, to receive the internally-threaded end $f$ of the draw-nut or clamp member F, such member D having its unthreaded end flared out, as at $d^x$, to form a bearing-head, for a purpose presently described.

G indicates a clamping-sleeve, which is adapted to fit over the lead-pipe section and has a beveled bearing portion $g$, which in operation bears against the outer flared end of such pipe-section, such end terminating in a shouldered portion $g'$, which is arranged to engage an annular inturned flange $f^3$ of the draw-ring F.

E indicates a packing or gasket, which is also angular or V-shaped in cross-section and is adapted to fit snugly over the ring B to form a packing-washer against which the ends of the pipe and the shank and clamp member $d$ are adapted to bear.

It should be stated that by making the gasket E angular or V-shaped it in practice can be made slightly smaller than the ring B, whereby when stretched thereover it will be held firm thereon and not twist or curl out of position as separate straight washers would do.

So far as described it will be readily understood that when it is desired to connect the cock A with a lead pipe-section the threaded shank is passed through the marble slab H or other fixed body and the nut D screwed on the shank until its flared end bears tightly against the slab and clamps the cock in place. The ring B and gasket E are now placed in position and the lead pipe-section with the rings G and F are brought into place and the ring F screwed onto the threaded portion of the member D until the several parts are tightly drawn up to close joint. It is manifest that when the shank and member D are relatively of such a length that the member D is not screwed up with its end flush with the end of the shank, as shown, its end $d$ will always serve as a binding portion, against which the ring and packing is drawn as the nut F is screwed up tightly.

In Fig. 4 I have shown a slightly-modified form of the coupling devices, which is more especially adapted for connecting a lead pipe-section with a brass or other hard-metal pipe-section. In this case the member D is in the nature of a male union member, it being externally threaded at G′ to fit the internally-threaded end of the hard-metal pipe-section $C^x$. In Fig. 5 a similar arrangement of parts is shown, except that the member D is in this case arranged as a female union member, it having internal thread $D^x$, adapted to receive the externally-threaded end $C^y$ of a hard-metal pipe-section. It will be obvious that in practice the union members D and G in the latter construction may be made so as to join the lead pipe to iron or brass pipes of a smaller or larger diameter than the lead pipe-section or to hard pipe-sections of a similar diameter, and the member G may have the thread so cut that the pipe $C^y$ will so fit as not to form an internal obstruction.

From the foregoing, taken in connection with the drawings, the advantages of my improved devices will be readily apparent.

I am aware that it is not new to join the ends of two iron pipes externally threaded by means of union members, as shown in patent to Foster, No. 190,965, dated May 22, 1877, which union is exclusively adapted for joining two hard-metal pipe-sections and cannot be used at points where "wiped joints" are usually made.

It will be noticed by providing, as it were, a combined union and clamp device, the use of wiped joints, solder, or wiping-thimbles is abolished, as also the use of nuts or other clamping means usually employed to secure the cocks or valves, &c., to the slab bowl or tub.

Having thus described my invention, what I claim, and desire to secure by Letters Patent, is—

In a pipe-coupling of the class described the combination with the shank A′, threaded externally and having a beveled end, of the soft-metal pipe C, having a flared end $c$, the clamp-ring D, threaded externally and internally and having a beveled end, the packing-ring B, triangular in cross-section, the gasket E, V-shaped in cross-section and adapted to fit upon the ring B, said ring and gasket being adapted to rest between the ring D, and flared end $c$, the clamping-sleeve G, also flared at the end $g$, and the clamp member F, threaded internally and adapted to screw upon the ring D, said clamp member being adapted to bind the pipe C, and sleeve G, tightly upon the ring B, substantially as shown and described.

In testimony whereof I affix my signature in presence of two witnesses.

IRWIN J. FRENCH.

Witnesses:
FRED G. DIETERICH,
JAS. L. CRAWFORD.